United States Patent [19]

Butler, Jr.

[11] Patent Number: 4,589,820

[45] Date of Patent: May 20, 1986

[54] STRUCTURES FOR SOLAR WIND BUILDINGS

[76] Inventor: Tony W. Butler, Jr., 1416 Woodhollow, #9819, Houston, Tex. 77057

[21] Appl. No.: 574,557

[22] Filed: Jan. 27, 1984

[51] Int. Cl.$^4$ .............................................. F03D 3/04
[52] U.S. Cl. ................................. 415/2 R; 416/196 A
[58] Field of Search ............................... 415/2 R–4 R, 415/DIG. 8; 126/417; 52/235; 416/200 A, 194 A, 197 A, 196 A

[56] References Cited

U.S. PATENT DOCUMENTS

| | | | |
|---|---|---|---|
| 1,367,766 | 2/1921 | Bozied | 416/200 A X |
| 2,027,882 | 1/1936 | Ross | 52/235 X |
| 2,436,747 | 2/1948 | Du Brie | 416/197 A X |
| 3,357,144 | 12/1967 | Chauveau et al. | 52/235 X |
| 3,832,853 | 9/1974 | Butler | 60/641.12 |
| 4,004,427 | 1/1977 | Butler | 416/DIG. 6 X |
| 4,118,637 | 10/1978 | Tackett | 416/197 A X |
| 4,119,863 | 10/1978 | Kelly | 415/2 R X |
| 4,121,396 | 10/1978 | Oogami et al. | 52/235 |
| 4,134,707 | 1/1979 | Ewers | 415/4 R |
| 4,245,958 | 1/1981 | Ewers | 416/197 A |
| 4,357,130 | 11/1982 | Forrest | 416/197 A |

FOREIGN PATENT DOCUMENTS

| | | | |
|---|---|---|---|
| 455463 | 3/1949 | Canada | 416/200 A |
| 729533 | 12/1942 | Fed. Rep. of Germany | 415/4 R |
| 2601069 | 7/1977 | Fed. Rep. of Germany | 415/2 R |
| 2703917 | 8/1978 | Fed. Rep. of Germany | 415/2 R |
| 2291380 | 6/1976 | France | 415/3 R |
| 72271 | 6/1981 | Japan | 415/3 R |

Primary Examiner—Everette A. Powell, Jr.
Attorney, Agent, or Firm—Browning, Bushman, Zamecki & Anderson

[57] ABSTRACT

The present invention is directed to improved apparatus for incorporation in buildings and structures particularly useful in converting the energy of the wind to other usable energy forms. A rotor comprising a plurality of successively longer wind wheels interconnected along a common axis of rotation is disclosed. More particularly, an improved wind wheel construction useful in wind-driven rotors comprising a plurality of wind wheels is disclosed. Maximum power is developed by a wind wheel comprising some vanes located substantially parallel to the axis of rotation for maximum power development and other vanes located substantially perpendicular to the axis of rotation for both power development and stress reduction. A rotor comprising a plurality of wind wheels characterized by rotationally misaligned vanes reduces fluctuations in the rotational velocity of the rotor. Further, apparatus useful in providing both improved structural strength and support for exterior protective glazing is disclosed.

14 Claims, 9 Drawing Figures

STRUCTURES FOR SOLAR WIND BUILDINGS

BACKGROUND OF THE INVENTION

1. Field of the Invention

The present invention generally relates to apparatus useful with buildings constructed to maximize the use of energy derived from the sun and the wind. More particularly, the present invention relates to apparatus and methods for incorporation in such buildings and includes improved wind rotors for providing more even energy output at lower stress levels. The present invention also includes an improved, external, building support system capable of providing both structural support for the building and of supporting an exterior shell, such as solar efficient glazing or glass sheathing.

2. Description of the Background

The problem of developing structurally strong, energy effective and aesthetically pleasing apparatus for incorporation on or within buildings to convert wind energy and solar radiation to other usable energy forms has retarded the wide general use of such systems. The basic principles associated with systems useful for converting wind energy and solar radiation to other useful energy forms have been described in Applicant's prior U.S. Pat. Nos. 3,832,853 and 4,004,427. These patents merely describe exemplary systems which have been devised for converting natural wind energy and solar radiation into other useful energy forms. These patents disclose systems useful for converting both solar radiation and wind energy into a useful energy form and which are incorporated on or within a building.

The present invention is directed to improvements in such systems particularly useful with buildings constructed to take advantage of solar radiation and wind energy to supply a portion of the energy needs of the building. Accordingly, the disclosures of Applicant's prior U.S. Pat. Nos. 3,832,853 and 4,004,427 are, in their entireties, incorporated herein by reference.

These patents disclose means for converting wind energy into mechanical energy employing a plurality of wind wheels of identical configuration interconnected and affixed about a common axis of rotation. The wind wheels nearer to the driven means in such a system develop a higher torque and suffer from greater stress, resulting in a higher rate of fatigue failures than for the wind wheels located at greater distances from the driven means. The wind wheels nearer to the driven means must transmit to the driven means the torque developed in the distant wind wheels, as well as the torque which they develop via their own direct exposure to wind forces. Accordingly, if the lower of the identical wind wheels in these prior patents is of adequate strength to lastingly withstand its loads, then the upper wind wheels, being identically constructed, will be overbuilt, excessively heavy, employ an excess number of bearings and bearing support assemblies, have a greater number of wind gaps and operate at an efficiency level significantly below optimum.

Accordingly, a means of providing improved wind wheels to overcome such problems is desirable. It is also desirable that the wind wheels be constructed of relatively inexpensive, lightweight and preferably interchangeable parts in order to provide an efficient and economical device.

Prior wind devices often suffered from severe fluctuation of the rotational speed resulting from the vanes alternately being exposed to and shielded from the maximum wind velocity. Accordingly, it is also desirable to provide a wind wheel construction producing a relatively constant output with minimal fluctuations of rotational speed about an average value as the angle between the vanes and the wind changes.

Buildings have employed diagonal exterior bracing in order to provide additional structural strength. However, systems employing devices which are capable of both providing diagonal bracing to increase the structural strength of the building and providing means for supporting a protective surface, such as window glazing, do not exist. Such a system would be particularly useful in the construction of buildings making maximum use of wind systems which, even though in a minor way, would add to the existing wind loading of a building's supporting structure.

The improved wind rotor system of the present invention overcomes the above disadvantages of the prior systems for converting wind energy to another useful energy form. Further, the present invention provides a system particularly useful with glass sheathed buildings making maximum use of solar energy. The system of the present invention provides a means of both improving the structural integrity of the building and supporting the exterior glass sheathing.

SUMMARY OF THE INVENTION

The present invention provides a new and improved energy conversion system useful for converting wind energy to another usable energy form. The present invention includes a wind-driven means comprising a plurality of cooperating wind wheels aligned and interconnected along a common axis of rotation for converting the wind energy to mechanical energy. Further, the wind wheels located successively farther from the driven load are of successively longer axial length. Accordingly, the wind wheels located nearer the driven load are successively shorter and successively more stress-resistant.

Further, the wind wheels of such a system are constructed in essentially identical and interchangeable segments using a minimum of different parts. Permitting the interchangeability of many parts used in the construction of the wind wheels of the present invention provides an efficient and economical system.

In a further improvement, at least one of the wind wheels is rotatably positioned relative to the other wind wheels so that the output of the rotor is relatively constant and characterized by lower fluctuations associated with changes in the angle of the vanes to the maximum wind velocity. Such a result is obtained by interconnecting the wind wheels of the rotor so that the vanes of at least one wind wheel are not aligned with the vanes of the other wind wheels.

Another feature of the present invention includes a structural and glazing support system capable of both improving the structural integrity of the building and providing a means for affixing an exterior protective glazing surface to the building. Such a system is provided by support plates for mounting to an exterior structural surface of the building, preferably the horizontal support members of the building, together with appropriate bracing members. The support plates are preferably mounted in a pattern formed by the vertices of parallelograms superimposed upon the building surface. Most preferably, the support plates are located so that the bracing members are located diagonally between adjacent floors of the building and are all of the same length. Such a system is particularly efficient because the support plates and bracing members are all interchangeable. Such a configuration permits the use of a single support plate design and bracing member design resulting in efficiencies of manufacture, warehousing and construction. Such a system provides both external support for the building, permitting the elimination of some of the normal vertical support structure often located near the exterior of the building. Such a system also provides support for hanging a totally glazed exterior surface, such as glass sheathing, particularly useful in buildings taking advantage of solar radiation as an energy source.

BRIEF DESCRIPTION OF THE DRAWINGS

Other features and intended advantages of the invention will be more readily apparent by the references to the following detailed description in connection with the accompanying drawings wherein.

While the invention will be described in connection with a presently preferred embodiment, it will be understood that it is not intended to limit the invention to that embodiment. On the contrary, it is intended to cover all alternatives, modifications and equivalents as may be included within the spirit of the invention as defined in the appended claims.

DESCRIPTION OF THE PREFERRED EMBODIMENT

Figure 1:
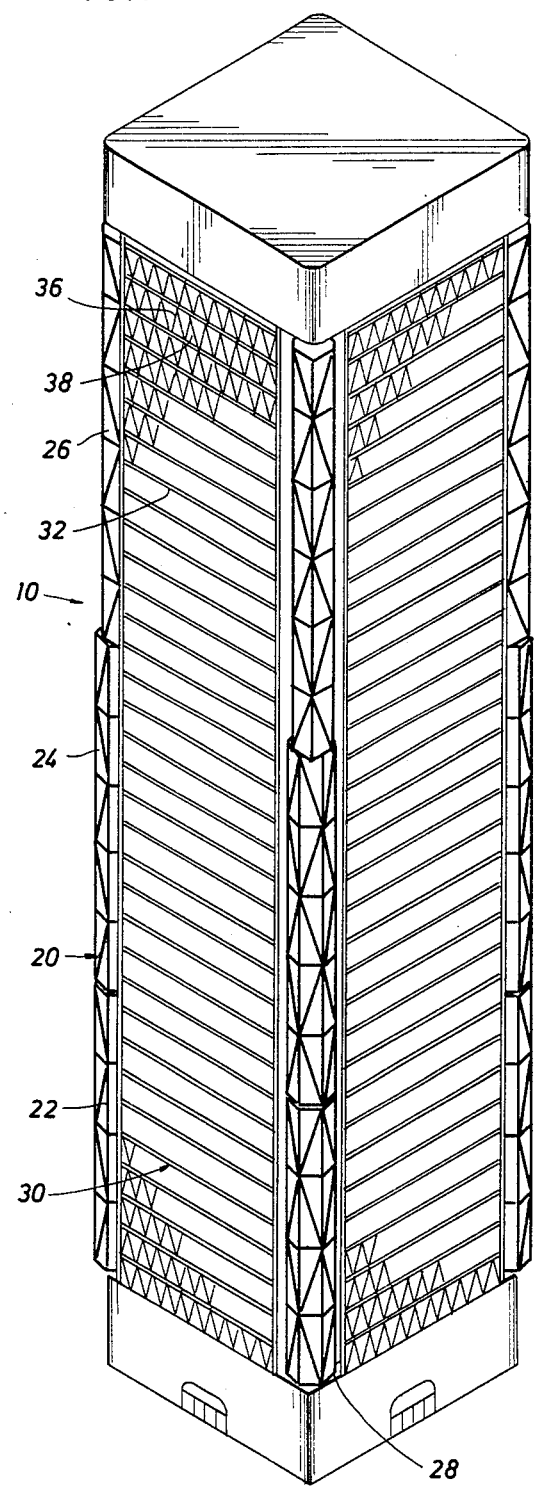
FIG. 1 is a perspective view of a building incorporating the improvements of the present invention.

FIG. 1 of the drawings illustrates generally building 10 incorporating the improved features of the present invention. Wind-driven means or rotor 20 comprises a plurality of wind wheels interconnected and aligned about a common axis. Rotors 20 occupy the three visible vertical corners of illustrated building 10. Any number of such wind-driven means may be located along any exterior surface of a building or may even be supported by a separate dedicated structure. However, it has been found convenient and efficient to locate such devices at the corners of buildings where they may be located in channels 28 by conventional means. Preferably, channels 28 have a cross section of about 110 degrees. Wind-driven means 20 located at the corners of building 10 advantageously permit efficient operation of the wind-driven means by winds moving about either of the adjacent sides of the building.

In the present invention, improved wind-driven means 20 comprises a plurality of axially aligned, cooperating wind wheels for converting the energy of the wind to useful mechanical energy wherein the wind wheels located successively farther from the driven load are of successively longer axial length. In the illustrative embodiment, the axially aligned wind wheels drive a load (not shown) connected to lowermost wind wheel 22. Accordingly, wind wheel 22 located nearest the driven load is characterized by the shortest axial dimension. Therefore, wind wheel 24 is characterized by a somewhat longer axial dimension and wind wheel 26 is characterized by the longest axial dimension. The present invention permits a rotor to be constructed which employs a fewer number of wind wheels, resulting in fewer bearings and fewer non-productive spaces between wind wheels. Accordingly, the number of bearings subject to failure is reduced with the present invention and the efficiency of the wind rotor is increased by the present invention.

Figure 6:
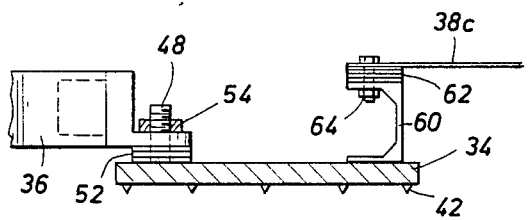
FIG. 6 is a schematic representation of an energy conversion system useful with the prsent invention.
Figure 6:
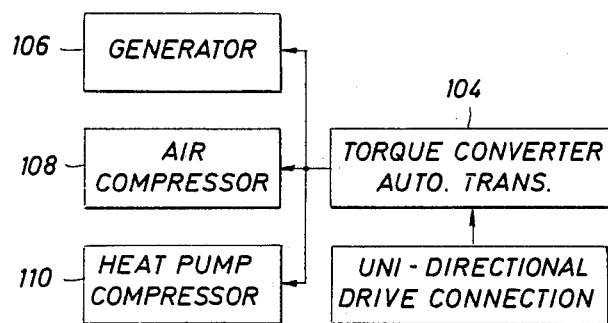

FIG. 6 illustrates generally and schematically the system of the present invention for converting the energy of the wind to another useful energy form. The wind rotates wind-driven means or rotor 20 comprising successively longer wind wheels 22, 24 and 26 (partially illustrated) in either direction, converting wind energy to mechanical rotational energy. Unidirectional drive connection 102 converts the rotation of wind-driven means 20 to rotational motion in a single direction. Torque converter and automatic transmission 104 converts the rotational motion from unidirectional drive connection 102 to the desired rotational speed for operation of a second energy converting device. Exemplary second energy converting devices include generator 106 for direct production of electricity, air compressor 108 to compress air for storage of energy and heat pump compressor 110 to provide heating or cooling to the building. The conversion of the rotational, mechanical energy produced by wind-driven means 20 to another usable energy form employs standard equipment and techniques. Accordingly, no further explanation of such apparatus or methods is necessary. Reference is made to the disclosures in Applicant's prior U.S. Pat. Nos. 3,832,853 and 4,004,427 wherein such conversion apparatus and methods are disclosed in greater detail.

It is presently preferred that the improved wind-driven means 20 of the present invention comprising a plurality of wind wheels 22, 24 and 26, as described above, be used in conjunction with a multi-story commercial building. However, it will be appreciated that such an improved wind-driven means may be employed with any structure, including single story homes and even free-standing towers, such as transmitter towers, or even dedicated buildings or towers whose sole purpose is the conversion of wind energy to other useful energy forms. Accordingly, the preferred environment described above for employing the present invention is not intended to limit the use of this invention, but is provided merely for illustrative purposes only.

Figure 2A:
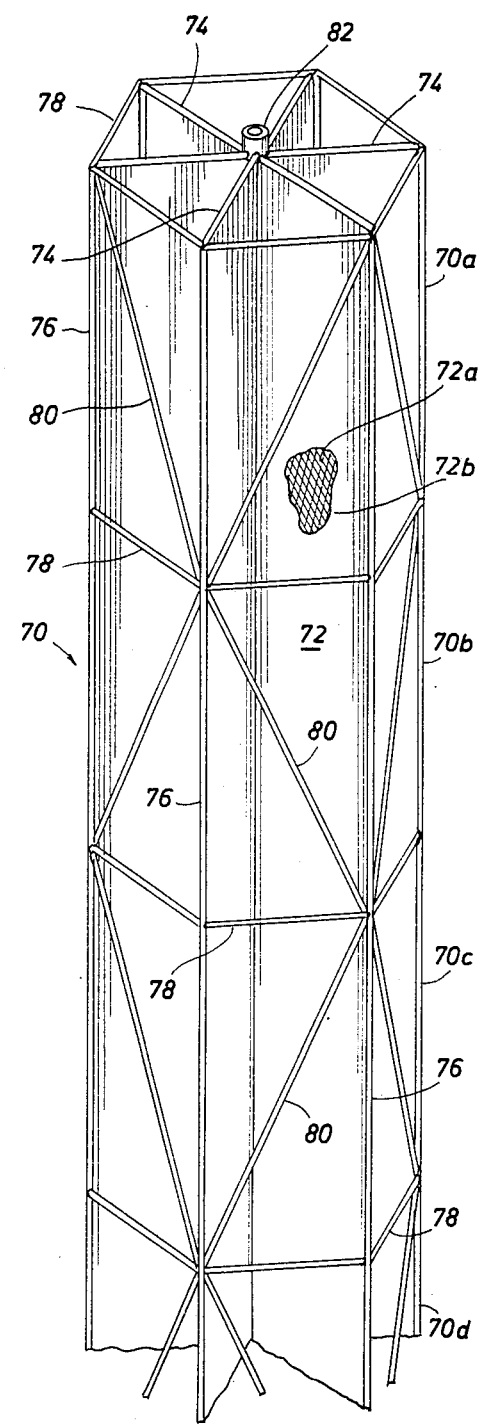
FIG. 2A is a view of a portion of a wind wheel in accord with the present invention.

FIG. 2A shows a portion of illustrative wind wheel 70 comprised of a plurality of essentially identical sections 70a, 70b, 70c and 70d interconnected longitudinally. One or more wind wheel sections are interconnected to produce a wind wheel having the desired axial dimension. An appropriate rotational means or shaft is then affixed along the axis of the wind wheel. Such a rotational means is illustrated on wind wheel 70 by stubshaft 82 at either end thereof. Alternatively, a single, extended shaft is used in place of stubshafts 82.

Coplanar with and extending radially from the axis of wind wheel 70 are a plurality of longitudinal vanes 72. Vanes 72 are constructed of any appropriate material for catching the wind and turning the wind wheel. Such materials must be sufficiently strong to withstand the expected stress created by the wind and sufficiently lightweight to produce economical rotors. For example, vanes 72 are conveniently comprised of a sheet of perforated or honeycombed webbing 72a, such as fiberglass netting or high strength plastic, covered on one or both sides by a sheet of substantially impermeable material 72b, such as metallic foil, plastic film or the like which is resistant to ultraviolet degradation. Such a construction provides an extremely lightweight and even flexible vane 72 which, when supported along its external surfaces by appropriate bracing and strut members, provides vanes having the desired tensile strength, yet being sufficiently lightweight, to provide a strong and economical wind wheel.

The plurality of vanes 72 arranged in a desired configuration are easily and conveniently constructed by affixing together along their longitudinally or axial bisector a plurality of sheets of vane material and bending or forming the vane material to the desired angles. FIG. 2C is a cross-sectional view of a wind wheel so constructed wherein three sheets of vane material have been affixed along their longitudinal bisector by a plurality of fastening means 84. Any suitable fastening means may be employed. For example, a plurality of bolts or rivets with appropriate washers may be installed along the longitudinal bisector or alternatively strips of bracing material 84a may be held by a plurality of bolts or rivets 84b. To produce vanes 72 in the desired configuration, the sheets of vane material so affixed are merely formed or bent to the desired angle. In the illustrated examples, three sheets of vane material have been formed into six vanes 72 arranged hexagonally and separated by about sixty degrees.

Each wind wheel section, e.g., section 70a, further comprises a plurality of bracing members affixed along the exterior edges of vanes 72. Vanes 72 are supported and braced along their radial edges by radial bracing members 74 conveniently provided by high strength tubular aluminum or magnesium rods. Radial bracing members 74 are constructed so as to be usable as end bracing members. The exterior longitudinal edge of vanes 72 are further braced by a plurality of axial bracing members 76. Such axial bracing members 76 are conveniently constructed of materials similar to those used in constructing radial bracing members 74. However, it is not necessary that axial bracing members 76 be as strong as radial bracing members 74. In fact, because of the goal of maintaining the weight of wind wheel 70 at a minimum, axial bracing members 76 will generally be characterized by a lower weight and strength than radial bracing members 74. Additional bracing is provided by circumferential bracing members 78 connecting the exterior edges of adjacent vanes 72 and generally located in a plane relatively perpendicular to the axis of rotation of wind wheel section 70a. Preferably, circumferential bracing members 78 interconnect the nearest exterior vertices of adjacent vanes 72. Finally, still additional strength is provided by diagonal bracing members 80 interconnecting the exterior edges of adjacent vanes 72, preferably at non-adjacent vertices. All of the bracing members are conveniently provided by appropriate lengths of sufficiently strong, yet lightweight cylindrical shafts.

As will be appreciated from the above description and accompanying drawings, wind wheels of any desired length are easily and conveniently constructed from a minimal inventory of parts employing the present sectional construction technique. Wind wheels of a multitude of lengths are easily constructed by simply constructing the desired number of interconnected sections 70a, 70b and the like. Accordingly, wind wheels of a plurality of lengths in multiples of the longitudinal dimension of the sections are conveniently and economically constructed employing a plurality of vanes 72 together with a selection of supports from bracing members 74, 76, 78 and 80 to be affixed to a rotary shaft of appropriate length or to suitable stub shafts 82.

A plurality of wind wheels 70 constructed with the desired axial dimensions using the means described above and suitably interconnected end-to-end for joint rotation by conventional means, such as by hexagonal box and pin connections or the like (not shown), are mounted along a common rotational axis to produce a wind-driven means or rotor 20 in accord with the present invention. A plurality of such wind-driven means 20 located about the exterior of a supporting structure are drivingly connected to an energy conversion system such as that described above and illustrated in FIG. 6.

Figure 2B:
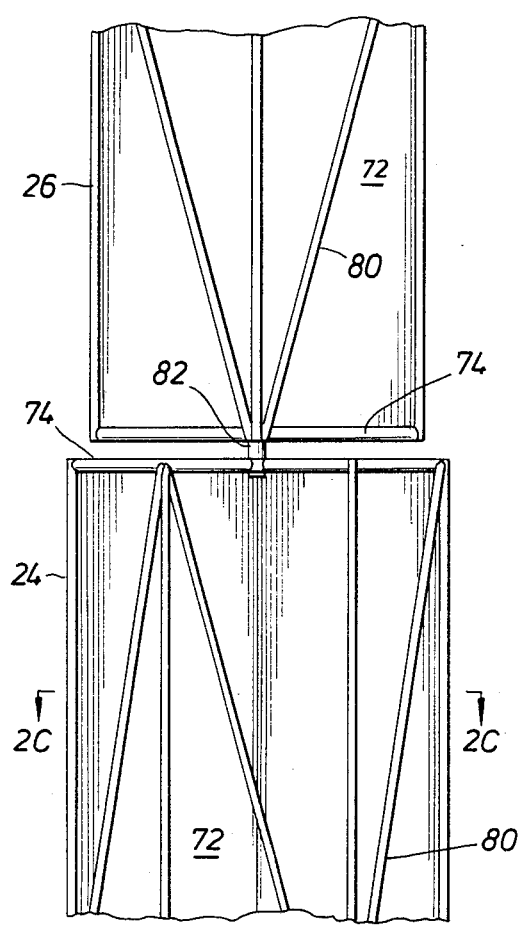
FIG. 2B is a view of a portion of the intersection of two rotationally misaligned wind wheels in accord with the present invention.
Figure 2C:
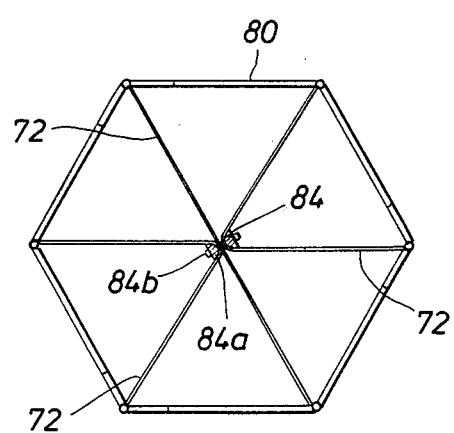
FIG. 2C is a cross-sectional view through 2C—2C of FIG. 2B of a wind wheel in accord with the present invention.

Another feature of the present invention is illustrated in FIG. 1 and in more detail in FIG. 2B. In the illustrative example, wind wheel 26 is rotationally positioned and interconnected with wind wheels 24 and 22 so that vanes 72 of wind wheel 26 are located substantially along the planes bisecting the angles between vanes 72 of wind wheels 24 and 22. Such an arrangement produces a more constant rotational velocity and minimizes the fluctuation in rotational power transmitted to the driven load. Such an improved configuration more evenly converts the wind energy striking the vanes to another usable energy form. An arrangement whereby the vanes of one or more of the wind wheels interconnected along a common axis of rotation lie in different planes rotationally unaligned is desirable to minimize such fluctuations.

Figure 2D:
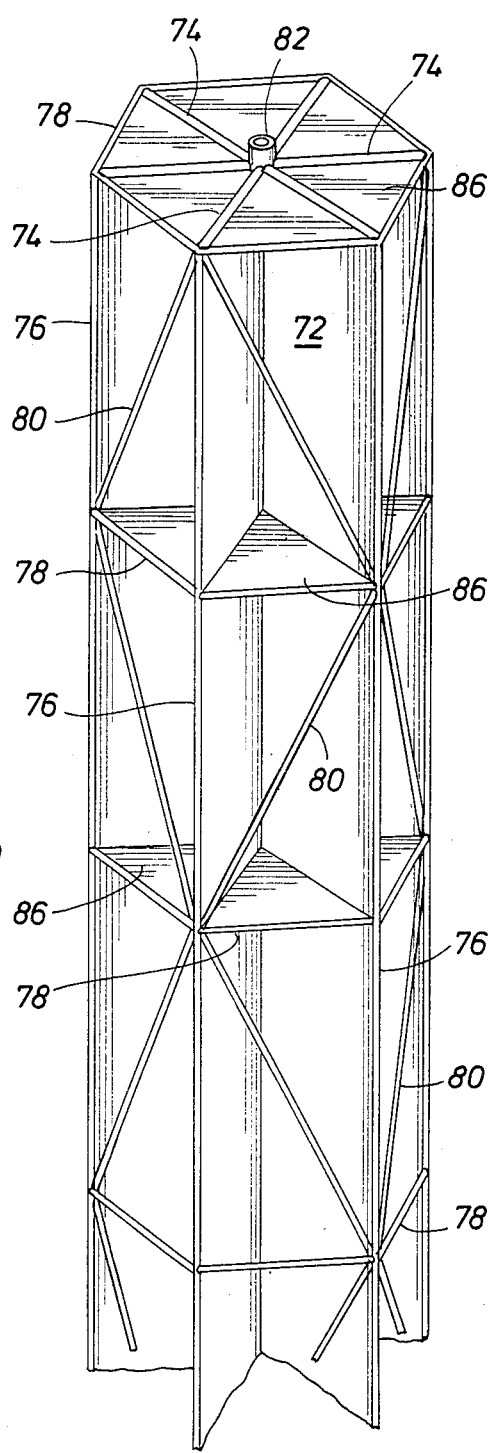
FIG. 2D is a view of a portion of the upper wind wheel of the present invention illustrating the use of vanes perpendicular to the axis of rotation of the wind wheel.

Still another feature of the present invention is illustrated in more detail in FIG. 2D. Perpendicular vanes 86, preferably constructed of a material impermeable to the wind, such as the same material comprisng vanes 72 is optionally affixed about the axis of rotation and generally in a plane perpendicular thereto. Webbing 86 is conveniently affixed to radical bracing members 74 and circumferential bracing members 78. Webbing 86 is most beneficial when added near the top of wind rotor 20 to take advantage of substantial updraft to both increase the rate of rotation and to decrease the effective weight of the rotor.

Another feature of the present invention is particularly useful in the construction of buildings which will make extensive use of wind energy which may tend to increase the stress and load to the building. This additional feature provides both improved structural support for the building and support for an extensive, exterior glazing which is useful with buildings also making use of solar energy. Such a system is provided by a plurality of diagonal bracing members 36 extending between a plurality of support plates 34 mounted along the exterior surface of the structural framework of the building, preferably along the horizontal beams or structural members of the building. Support plates 34 include anchoring posts 48 for diagonal bracing supports 36 and support and anchoring flanges 60 for attachment of appropriately sashed glazing. In the presently preferred embodiment, the structural strength added to the building is maximized by locating support plates 34 along the exterior of the horizontal framework of the building in a pattern based on the vertices of parallelograms located along the horizontal framework members 32 forming the base of each floor of the building. In a preferred embodiment, the diagonal bracing members 36 form the equal sides of isosceles triangles having their bases parallel and located preferably along the horizontal framework. With this preferred pattern, glazing 38 in the shape of isosceles triangles is employed. Such a pattern may also be described as a diamond-shaped bracing pattern and may include rhomboid glazing if no horizontal bracing is added.

Support plates 34 comprise a relatively flat base 40 having therein means for mounting the plate to the exterior of the framework of the building, preferably to beams 32. One such means is provided by holes 44 in base 40 for mounting over threaded studs 46 projecting from beam 32 and securing by threaded nuts 47. However, any conventional mounting means may be employed. Further, studs 46 may be constructed or adapted to permit other structures to be affixed to the exterior of the building, such as the solar louvers of my prior U.S. patents referred to above. Base 40 optionally also includes cleats 42 to better engage the building framework. Support plate 34 also comprises a plurality of means for attaching diagonal bracing members 36 thereto. In a preferred embodiment, such means is provided by a plurality of threaded studs 48 to which diagonal bracing members 36 are attached by placement through holes 50. Threaded nuts 54 secure the bracing members in place. Again, any conventional attaching means may be employed. Variable thickness spacing members such as a plurality of washers 52 are employed as needed with these studs to accommodate tolerances in building construction. Support plate 34 further comprises a plurality of attached support and anchoring flanges 60 to which are affixed the building glazing 38 or sashing 38c containing the glazing by any conventional means. One such means comprises fasteners 64 used together with variable thickness adjusters 62, again to compensate for building tolerances. Conventional sashed glazing 38, such as glass sheathing, is applied to cover the exterior of the building.

Figure 3:
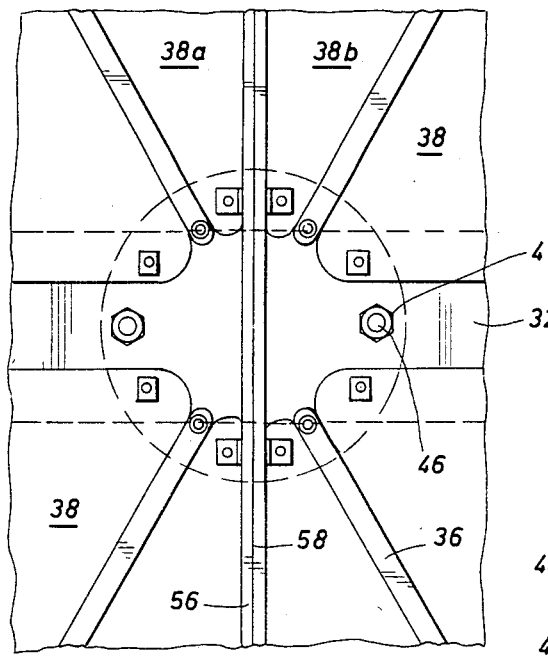
FIG. 3 is a view of a portion of the exterior of a building incorporating the support system of the present invention and illustrating the area over a support plate and a portion of the diagonal bracing and glazing in accord with the present invention.
Figure 4:
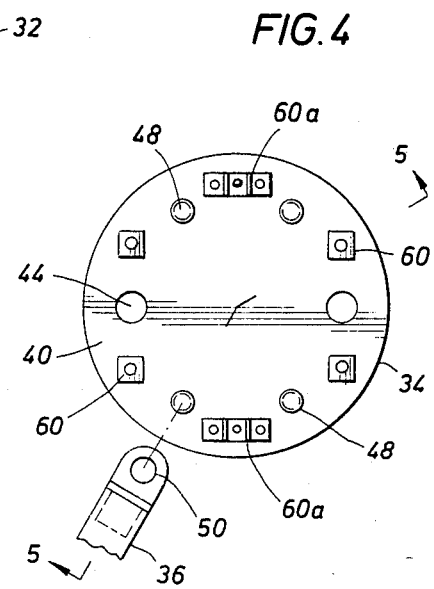
FIG. 4 is a view of a support plate useful in accord with the present invention.
Figure 5:
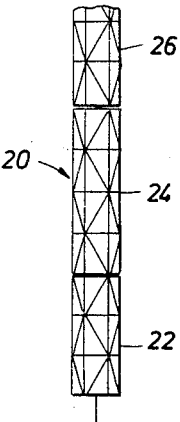
FIG. 5 is a cross-sectional view through 5—5 of FIG. 4 illustrating a portion of the support plate, together with an attached bracing member and sashing.

FIG. 3 illustrates the addition of vertical track 56 having therein groove 58 representing a conventional window washing track. Such a device is conveniently incorporated within the structure of the present device by mounting to the support plate on anchoring flanges 60a. Such a device is conveninently incorporated on the exterior surface of the building, resulting in some of the glazing sections 38 being applied as symmetrical right-angled portions 38a and 38b.

The foregoing description of the invention has been directed in primary part to a particular preferred embodiment in accordance with the requirements of the patent statutes and for purposes of explanation and illustration. It will be apparent, however, to those skilled in the art, that many modifications and changes in the specifically described apparatus may be made without departing from the scope and spirit of the invention. Therefore, the invention is not restricted to the particular form of construction and method illustrated and described, but covers all modifications which may fall within the scope of the following claims.

It is Applicant's intention in the following claims to cover such modifications and variations as fall within the true spirit and scope of the invention.

What is claimed is:

1. In an energy conversion apparatus for converting naturally occurring wind energy to a usable energy form and including a wind driven means supported by an edifice having generally vertical, outwardly facing side surfaces impervious to wind, the improvement comprising:
   a substantially vertical, elongated channel formed in an exterior side surface of said edifice, said channel having a lower end and an upper end;
   an elongated rotor assembly disposed partially within and along said channel,
      the axis of rotation of said assembly being substantially vertical and disposed within said channel,
      said rotor assembly comprising a plurality of cooperating and interconnected wind wheels aligned along said axis, each said wind wheel comprising first means for catching the wind passing substantially perpendicular to said channel and around said edifice for converting the wind energy in and near said channel into rotational energy of said rotor assembly,
      one of said wind wheels being a lift wind wheel and further comprising second means for catching the wind passing substantially parallel to said channel for converting wind energy to mechanical energy to decrease the effective weight of said rotor assembly, and
      the axial length of each said wind wheel increasing with increasing distance of each said wind wheel from said lower end; and
   means driven by the lower end of said rotor assembly for converting the rotational energy of said rotor assembly to another energy form.

2. The apparatus of claim 1 wherein said first means for catching comprises a plurality of first vanes substantially coplanar with and radiating from the axis of rotation of each of said wind wheels.

3. The apparatus of claim 2 wherein said second means for catching comprises a plurality of second vanes substantially perpendicular to the axis of rotation of said lift wind wheel.

4. The apparatus of claim 3 wherein said wind wheels each further comprise bracing members affixed along the exterior edges of said first and second vanes.

5. The apparatus of claim 4 wherein the bracing members affixed to the radial edges of said first and second vanes are stronger than the bracing members affixed to the axial edges.

6. The apparatus of claim 5 wherein said bracing members are comprised of strong, lightweight tubular members.

7. The apparatus of claim 2 wherein said wind wheels are rotationally positioned relative to one another about their common rotational axis in positions to minimize the fluctuation in power transmitted to the driven load to more evenly convert the wind energy striking the vanes to usable energy.

8. The apparatus of claim 7 wherein the first vanes of at least one of said wind wheels are not rotationally aligned with the first vanes of another of said wind wheels.

9. The apparatus of claim 8 wherein said lift wind wheel is the wind wheel nearest said upper end and the vanes of said lift wind wheel are not rotationally aligned with the vanes of any other of said wind wheels.

10. The apparatus of claim 9 wherein all of said wind wheels with the exception of said lift wind wheel are characterized by having all of their first vanes rotationally aligned with one another.

11. The apparatus of claim 10 wherein the first vanes of said lift wind wheel are rotationally positioned relative to the first vanes of the other of said wind wheels so that the vanes of said lift wind wheel are located substantially along the planes bisecting the angles between the first vanes of said other wind wheels.

12. The apparatus of claim 11 wherein said first vanes are substantially planar and symmetrically located about said axis of rotation.

13. The apparatus of claim 6 further comprising
   a plurality of circumferential bracing members connecting the bracing members affixed to the exterior axial edges of said adjacent first vanes; and
   a plurality of diagonal bracing members extending between the exterior axial edges of said adjacent first vanes.

14. The apparatus of claim 1 wherein said lift wind wheel is the wind wheel nearest said upper end.

* * * * *